(12) United States Patent
Goslin

(10) Patent No.: US 10,702,770 B2
(45) Date of Patent: Jul. 7, 2020

(54) SYSTEM AND METHOD OF CONFIGURING DISPARATE PHYSICAL OBJECTS TO PROVIDE CONTROL SIGNALS FOR CONTROLLING A GAME

(71) Applicant: DISNEY ENTERPRISES, INC., Burbank, CA (US)

(72) Inventor: Michael Goslin, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 175 days.

(21) Appl. No.: 15/145,731

(22) Filed: May 3, 2016

(65) Prior Publication Data

US 2017/0319954 A1 Nov. 9, 2017

(51) Int. Cl.
| | | |
|---|---|---|
| *A63F 13/24* | (2014.01) | |
| *A63F 13/218* | (2014.01) | |
| *A63F 13/213* | (2014.01) | |
| *A63F 13/215* | (2014.01) | |
| *A63F 13/211* | (2014.01) | |
| *H04W 4/70* | (2018.01) | |

(52) U.S. Cl.
CPC ............ *A63F 13/24* (2014.09); *A63F 13/211* (2014.09); *A63F 13/213* (2014.09); *A63F 13/215* (2014.09); *A63F 13/218* (2014.09); *H04W 4/70* (2018.02)

(58) Field of Classification Search
CPC ...................................................... A63F 13/06
See application file for complete search history.

(56) References Cited

U.S. PATENT DOCUMENTS

| | | | | |
|---|---|---|---|---|
| 7,331,856 B1* | 2/2008 | Nakamura | ............... | A63F 13/00 463/7 |
| 7,839,382 B2* | 11/2010 | Ueshima | ............... | A63F 13/573 273/317.6 |
| 7,874,918 B2* | 1/2011 | Osnato | .................... | A63F 13/06 273/148 B |
| 2005/0014542 A1* | 1/2005 | Ueshima | ................. | A63F 13/02 463/8 |
| 2007/0270222 A1* | 11/2007 | Yamanaka | ............ | A63F 13/211 463/37 |
| 2008/0280660 A1* | 11/2008 | Ueshima | ............... | A63F 13/211 463/3 |

(Continued)

OTHER PUBLICATIONS

FIFA 2015, https://www.youtube.com/watch?v=H5zQec03s_g, Published on Sep. 10, 2014.*

(Continued)

*Primary Examiner* — Reginald A Renwick
(74) *Attorney, Agent, or Firm* — Esplin & Associates, PC

(57) ABSTRACT

Systems and methods of configuring disparate physical objects to provide control signals for controlling one or more of a game, a virtual space, a video game taking place in the virtual space, and/or other interactive games are described herein. Individual physical objects may include one or more sensors and/or other components. Output signals generated by the one or more sensors may be used to determine control signals. For example, control specification information may be utilized. Control specification information may specify associations between output signals and control signals, and/or other associations.

16 Claims, 5 Drawing Sheets

(56) References Cited

U.S. PATENT DOCUMENTS

| | | | |
|---|---|---|---|
| 2009/0048021 A1* | 2/2009 | Lian | A63F 13/06 |
| | | | 463/37 |
| 2009/0298590 A1* | 12/2009 | Marks | A63F 13/02 |
| | | | 463/37 |
| 2011/0034248 A1* | 2/2011 | Grever | A63F 13/22 |
| | | | 463/36 |

OTHER PUBLICATIONS

Matt Casamassina, "Wii Sports Review" https://www.ign.com/articles/2006/11/14/wii-sports-review. Created Nov. 13, 2006.*

* cited by examiner

SYSTEM AND METHOD OF CONFIGURING DISPARATE PHYSICAL OBJECTS TO PROVIDE CONTROL SIGNALS FOR CONTROLLING A GAME

FIELD OF THE DISCLOSURE

This disclosure relates to configuring disparate physical objects to provide control signals for controlling a game.

BACKGROUND

Computing platforms, such as gaming consoles, be associated with controls and/or controllers that may be specific to a given computing platform. As such, controllers of one computing platform may be unusable for another computing platform.

SUMMARY

One aspect of the disclosure relates to a system configured for configuring disparate physical objects to provide control signals for controlling one or more of a game, a virtual space, a video game taking place in the virtual space, and/or other interactive games. The physical objects may comprise network-enabled devices. An individual physical object may have one or more sensors configured to generate output signals, and/or other components. The output signals generated by the sensors of the physical object may be associated with particular control inputs for controlling one or more user-controlled elements of one or more of a game, a virtual space, a video game taking place in the virtual space, and/or other interactive games. In some implementations, the associations may be defined by a user.

The system may include one or more of non-transitory electronic storage media, one or more physical processors, one or more physical object, and/or other components. The one or more physical object may comprise one or more of a first physical object, a second physical object, and/or other physical objects. The first physical object may have a first sensor disposed thereon, and/or other components. The first sensor may be configured to generate a first output signal and/or other output signals. The second physical object may have a second sensor disposed thereon, and/or other components. The second sensor may be configured to generate a second output signal and/or other output signals.

The non-transitory electronic storage media may be configured to store control specification information, and/or other information. The control specification information may specify associations between output signals generated by sensors and control signals, and/or other information. By way of non-limiting illustration, control specification information may specific a first association between the first output signal and a first control signal, a second association between the second output signal and a second control signal, and/or other associations.

The one or more physical processors may be configured by machine-readable instructions. Executing the machine-readable instructions may cause the one or more physical processors to facilitate configuring disparate physical objects to provide control signals. The machine-readable instructions may include one or more computer program components. The computer program components may include one or more of a user component, a space component, a reception component, a specification component, a control component, and/or other components.

The user component may be configured to access and/or manage one or more user identifications, user profiles, and/or user information associated with users of the system. The one or more user identifications, user profiles, and/or user information may include information stored by one or more computing platforms, one or more server, and/or other storage locations. User information may include control specification information that may be specific to a user of a user account and/or one or more other users.

The space component may be configured to implement one or more instances of the virtual space executed by machine-readable instructions to determine views of the virtual space. The virtual space may include a video game taking place in the virtual space. Users may participate in the virtual space and/or video game by controlling one or more user-controlled elements in the virtual space. Control may be exercised via one or more physical objects.

The specification component may be configured to determine the control specification information based on user input and/or other information. By way of non-limiting illustration, responsive to obtaining user input from a first user specifying the first association and the second association, the control specification information may be determined.

The reception component may be configured to obtain output signals generated by one or more sensors. Individual ones of the one or more sensors being disposed on individual ones of one or more physical objects.

The specification component may be configured to determine, from the obtained output signals, one or more control signals based on the control specification information and/or other information. By way of non-limiting illustration, the first control signal may be determined responsive to obtaining the first output signal. By way of non-limiting illustration, the second control signal may be determined responsive to obtaining the second output signal and/or other output signals. In some implementations, a third control signal may be determined responsive to obtaining a combination of the first output signal and the second output signal.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
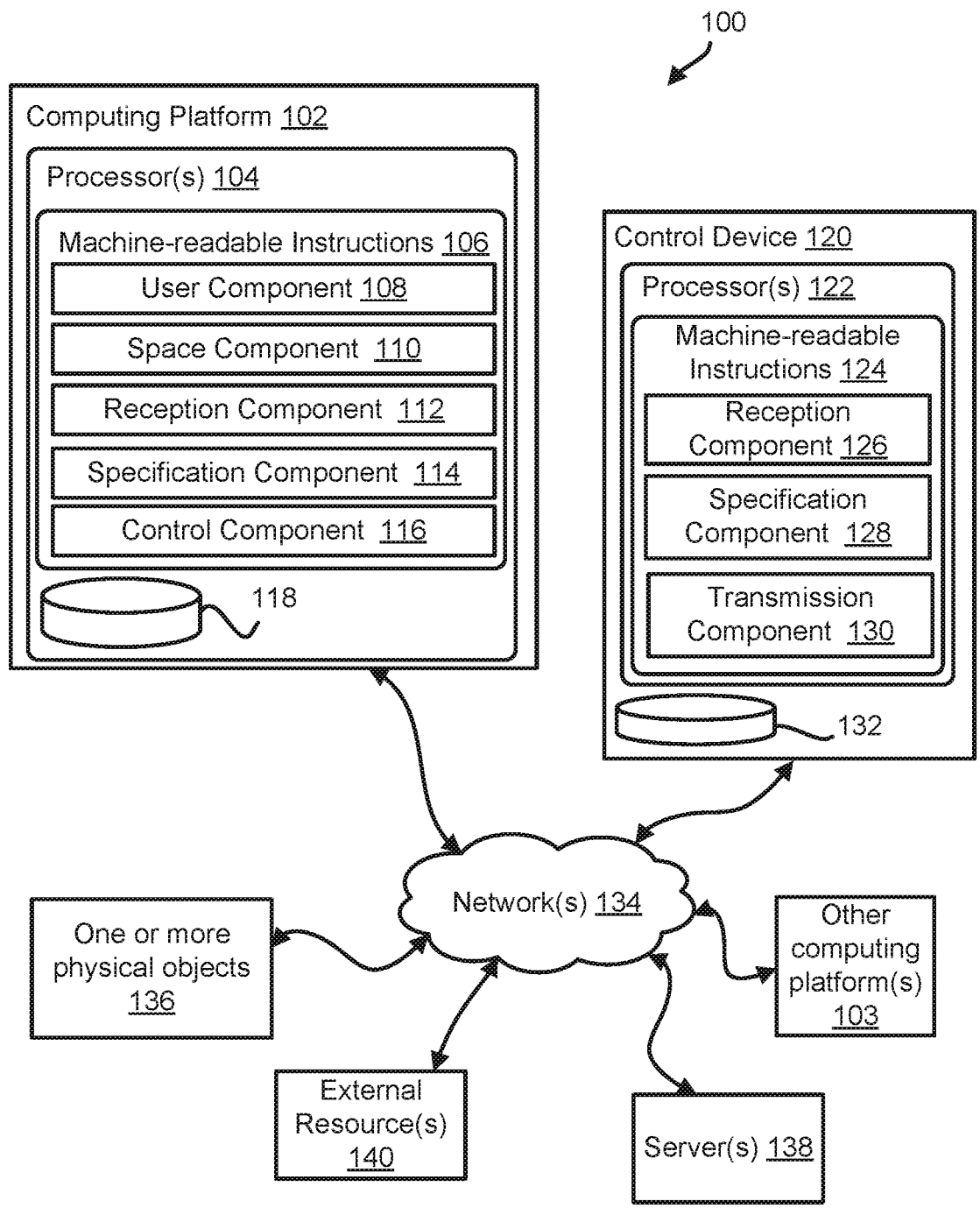
FIG. 1 illustrates a system for configuring disparate physical objects to provide control signals for controlling a game, in accordance with one or more implementations.

FIG. 1 illustrates a system 100 for configuring disparate physical objects to provide control signals for controlling one or more of a game, a virtual space, a video game taking place in the virtual space, and/or other interactive games, in accordance with one or more implementations. It is noted that although one or more description of system 100 may be directed to providing control signals for a virtual space and/or video game taking place in a virtual space, this is for illustrative purpose only and is not to be considered limiting. By way of non-limiting illustration, one or more implementations may be configured such that control signals may be provided for controlling other types of (virtual and/or real) interactive games.

The system 100 may include one or more of one or more computing platforms (e.g., computing platform 102 and/or one or more other computing platforms 103), one or more control devices (e.g., control device 120 and/or other control devices), one or more physical objects 136, one or more servers 138, and/or other components. It is noted herein that one or more references made to computing platform 102 are provided for illustrative purpose and are not to be considered limiting. For example, in some implementations, one or more features and/or functions attributed to computing platform 102 may be similarly attributed to individual ones of one or more other computing platforms 103.

In some implementations, computing platform 102 may be configured to communicate with one or more servers (e.g., server(s) 138) according to a client/server architecture and/or other communication scheme. In some implementations, computing platform 102 may communicate with one or more other computing platforms 103 according to a peer-to-peer architecture, via communications routed through server(s) 138, and/or other communication schemes. In some implementations, computing platform 102 may communicate with control device 120 according to a peer-to-peer architecture, via communications routed through server(s) 138, and/or other communication schemes. In some implementations, computing platform 102 may communicate with one or more physical objects 136 according to a peer-to-peer architecture, via communications routed through network(s) 134, and/or other communication schemes.

One or more users may access system 100 and/or a virtual space via computing platform 102. Computing platform 102 may include one or more of a cellular telephone, a smartphone, a laptop, a tablet computer, a desktop computer, a television set-top box, a client device, a smart TV, a gaming console, and/or other device suitable for the intended purposes as described herein.

Computing platform 102 may include one or more of one or more physical processors 104 configured by machine-readable instructions 106, electronic storage 118, and/or other components. Executing the machine-readable instructions 106 may cause one or more physical processors 104 to facilitate configuring disparate physical objects to provide control signals. Computing platform 102 may be configured to present an instance of a virtual space and/or a video game taking place in the virtual space using one or more of information stored by and/or local to computing platform 102 (e.g., a game cartridge, game disk, memory card/stick, USB memory stick, electronic storage, and/or other considerations), information obtained from one or more servers 138, information obtained from one or more other computing platforms 103, and/or other information. The machine-readable instructions 106 may include one or more of a user component 108, a space component 110 a reception component 112, a specification component 114, a control component 116, and/or other components.

Individual ones of one or more physical objects 136 may be separate and distinct from other individual ones of the one or more physical objects 136. By way of non-limiting illustration a physical object may be a standalone object. Individual ones of one or more physical object 136 may include one or more of: one or more sensors configured to generate output signals, one or more transmitters configured to transmit output signals and/or other information, one or more receivers configured to receive information, non-transitory electronic storage, and/or other components. One or more sensors and/or other components of an individual physical object may be integrally coupled to the physical object. One or more sensors and/or other components of an individual physical object may be removably coupled to the physical object. A transmitter and/or receiver may comprise a RFID, and/or other devices.

In some implementations, individual ones of one or more physical objects 136 may be configured to communicate with one or more of one or more other physical objects, computing platform 102, control device 120, and/or other entities participating in system 100. Communication may be facilitated via network(s) 134 and/or other communication scheme. In some implementations, individual ones of one or more physical objects 136 may be network-enabled devices. By way of non-limiting illustration, individual ones of one or more physical objects 136 may include embedded electronics, software, sensors, and/or network connectivity that may enable individual ones of the physical objects to collect and/or exchange information.

In some implementations, output signals generated by one or more sensors of a physical object may convey one or more of sound, motion, position, orientation, state of the one or more sensors, and/or other information associated with the physical object. In some implementations, a sensor may comprise one or more of an accelerometer, a pressure sensor, an actuator, a motion sensor, an orientation sensor, a light sensor, a microphone, a gyroscope, a flex sensor, an EEG, an EMG, a camera, and/or other sensors.

By way of non-limiting illustration, one or more physical objects 136 may include one or more of a first physical object, a second physical object, and/or other physical objects. The first physical object may be separate and distinct from the second physical object. The first physical object may include a first sensor and/or other components. The first sensor may be configured to generate a first output signal and/or other output signals. The second physical object may include a second sensor and/or other components. The second sensor may be configured to generate a second output signal and/or other output signals.

Electronic storage 118 may be configured to store control specification information, and/or other information. Control specification information may specify associations between output signals generated by individual sensors and control signals. Control signals may comprise one or more of routines, instructions, commands, and/or other information for controlling one or more user-controlled elements of a virtual space and/or video game taking place in the virtual space (see, e.g., space component 110). In some implementations, associations between output signals and control signals may be on a basis of a one-to-one relationship, a many-to-one relationship, one-to-many relationship, and/or other relationships that may specify associations between output signals and control signals. By way of non-limiting example, an individual output signal may be associated with an individual control signals. In some implementations, one or more output signals may be associated with a common control signal. In some implementations, an individual output signal may be associated with more than one control signal. In some implementations, a specific combination of individual output signals may be associated with an individual control signal.

By way of non-limiting illustration, control specification information may specify one or more of a first association between the first output signal and/or other output signals and a first control signal and/or other control signals; a second association between the second output signal and/or other output signals and a second control signal and/or other control signals; a third association between a combination of the first output signal, the second output signal, and/or other output signals and a third control signal and/or other control signals; and/or other associations. In some implementations, control specification information may comprise a look up table, and/or other type of specification.

In some implementations, determining the third control signal and/or other control signals may depend on one or more attributes of the combination of the first output signal, the second output signal, and/or other output signals. By way of non-limiting illustration, an attribute of the combination may include one or more of a time window in the signals may be obtained, a sequential order in which the signals may be obtained, and/or other attributes of the combination. By way of non-limiting illustration, control specification information may specify that a combination that includes, in sequential order, the first output signal then the second output signal, may be associated with a fourth control signal and/or other control signals. By way of non-limiting illustration, control specification information may specify that a combination that includes, in sequential order, the second output signal then the first output signal, may be associated with a fifth control signal and/or other control signals. By way of non-limiting illustration, control specification information may specify that a combination that includes the first output signal, second output signal, and/or other output signals being obtained within a first threshold time window, may be associated with a sixth control signal and/or other control signals.

In some implementations, control specification information may be associated with one or more control specification templates. A control specification template may comprise one or more predetermined and/or pre-set associations between output signals and control signals. In some implementations, a template may be associated with a set of related physical objects and/or a set of one or more sensors of the set of related physical objects. By way of non-limiting illustration, one or more physical objects may be related by a common theme. A theme may comprise one or more of a brand, a sport, a time period, and/or other themes. In some implementations, a set of physical objects may be associated with a given template based on the set of physical objects typically being used together.

By way of non-limiting illustration, a theme may comprise "music." A set of physical objects may include one or more of an electronic drum set having one or more sensors, an electric guitar having one or more sensors, a microphone having one or more sensors, and/or other physical objects. The control specification information may include a control specification template that may be specific to the "music" theme. By way of non-limiting example, a control specification template may specify associations that may be specific to output signals of individual ones of the one or more sensors of the electronic drum, the electric guitar, and the microphone.

In some implementations, control specification information may be specific to a given computing platform. For example, one or more control signals specified by control specification information may be specific to a given computing platform. By way of non-limiting illustration, a given computing platform may be a gaming console. The gaming console may be configured to accept control signals of a certain type and/or configuration.

The user component 108 may be configured to access and/or manage one or more user identifications, user profiles, and/or user information associated with users of system 100. The one or more one or more user identifications, user profiles, and/or user information may include information stored by computing platform 102, server(s) 126, and/or other storage locations. The one or more user identifications, user profiles, and/or user information may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, interaction history among users in the virtual space, information stated by users, purchase information of users, browsing history of users, a computing platform identification associated with a user, a phone number associated with a user, control specification information (e.g., that may be specific to the user of the user account), and/or other information related to users.

The space component 110 may be configured to implement one or more instances of the virtual space executed by machine-readable instructions 106 to determine views of the virtual space. The view presented may be determined based on one or more of information that may be local to and/or otherwise accessible to computing platform 102, (e.g., a game cartridge, game disk, memory card/stick, USB memory stick, electronic storage, and/or other considerations), information obtained from one or more servers 138, information obtained from one or more other computing platforms 103, and/or other information. In some implementations, the virtual space may be hosted by server 102 such that the views may then be communicated (e.g., via streaming, via object/position data, and/or other information) from server(s) 138 to individual computing platforms 118 for presentation to users. For example, server(s) 138 may include one or more physical processors configured by machine-readable instructions including the same or similar component as machine-readable instructions 106 of computing platform 102. By way of non-limiting illustration, server(s) 138 may comprise one or more of a host server, a game server, a virtual space server, and/or other types of servers.

The view determined and presented to a given user may correspond to a game entity being controlled by the given user. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by one or more users via computing platforms that present the views of the virtual space to one or more users. The simulated space may include virtual space content. Virtual space content may include one or more of virtual objects, topography, and/or other virtual space content. The simulated space may express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by machine-readable instructions 106 may be synchronous, asynchronous, and/or semi-synchronous.

The above description of the manner in which views of the virtual space are determined by space component 110 is not intended to be limiting. The space component 110 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 110, users may control game entities, objects, simulated physical phenomena (e.g., wind, rain, earthquakes, and/or other phenomena), and/or other elements within the virtual space to interact with the virtual space and/or each other. One or more user controlled element(s) may move through and interact with the virtual space (e.g., non-user characters in the virtual space, and/or other virtual space content in the virtual space). The user controlled elements controlled by and/or associated with a given user may be created and/or customized by the given user. The user may have an "inventory" of virtual items and/or currency that the user can use (e.g., by manipulation of a game entity or other user controlled element, and/or other items) within the virtual space.

Virtual object may include virtual items and/or goods. Virtual items and/or goods may include one or more of a virtual weapon, a tool, a food, a currency, a reward, a bonus, health, a potion, an enhancement, a mount, a power-up, a speed-up, clothing, a vehicle, an anatomical feature of a game entity, a troop or troop type, a pet, a virtual resource, and/or other virtual items and/or goods.

The users may participate in the instance of the virtual space by controlling one or more of the available user controlled elements in the virtual space. Control may be exercised through control inputs and/or commands input by the users through computing platform(s) 102. Control of one or more user-controlled elements via control inputs may be specified by control specification information (see, e.g., electronic storage 118, specification component 114, control component 116, and/or other components), and/or other information.

The users may interact with each other through communications exchanged within the virtual space. Such communications may include one or more of textual chat, instant messages, private messages, voice communications, and/or other communications. Communications may be received and entered by the users via their respective computing platforms. Communications may be routed to and/or from the appropriate users through server(s) 138.

User participation in the virtual space may include controlling game entities in the virtual space. A game entity may refer to a virtual object (or group of objects) present in the virtual space that represents an individual user. For example, a game entity may be a virtual character (e.g., an avatar) and/or other virtual objects. A group of game entities may include a group of virtual characters, virtual objects, and/or other content. In some implementations, user control may be exercised through one or more physical objects 136. Control exercised through one or more physical objects 136 may be implemented using control specification information, and/or other information.

The reception component 112 may be configured to obtain one or more of output signals from one or more sensors of one or more physical objects 136, signals conveying information stored by individual physical objects (e.g., within electronic storage of individual physical objects), and/or other information. In some implementations, information stored by a physical object may include information associated with the physical object. In some implementations, information associated with a physical object may include one or more of information identifying the physical object, information facilitating detection of the physical object, and/or other information. In some implementations, information associated with a physical object may include one or more of a name, an identification, a serial number, a key, a code, and/or other information.

In some implementations, reception component 112 may be configured to detect presence of individual ones of one or more physical objects 136 based on signals obtained from the physical objects. Reception component 112 may be configured to identify individual ones of one or more physical objects 136 based on signals obtained from the physical objects. By way of non-limiting example, a first physical object may be detectable based on obtaining a signal conveying information associated with the first physical object, a second physical object being detectable based on obtaining a signal conveying information associated with the second physical object, and/or other physical objects may be detectable based on obtaining other signals.

The specification component 114 may be configured to perform one or more of determining control specification information based on user input; determining, from the obtained output signals, one or more control signals based on the control specification information; and/or other operations.

The specification component 114 may be configured such that determining control specification information based on user input may comprise one or more of effectuating presentation of a user interface, obtaining user input via the user interface associated with specifying control specification information, and/or other operations. In some implementations, a user interface may include one or more user interface elements. User interface element may include one or more of check boxes, drop down menus, text input fields, icons, and/or other elements. Individual ones of the user interface elements may be selectable to specify control specification information. In some implementations, control specification information may be determined by user selection and/or identification of one or more sensors (corresponding to particular output signals) and one or more control signals to associate with the output signals of the one or more sensors. In some implementations, control specification information may be determined by user selection and/or identification of one or more physical objects (having corresponding to sensors) and one or more commands associated with one or more control signals. User input via a user interface to specify control specification information may be provided in other ways.

By way of non-limiting illustration, a user interface may include one or more of a first selectable icon having a graphic representing a given physical object (e.g., an electronic drum set), a second selectable icon having a graphic representing a given command associated with a control signal (e.g., "jump"), and/or other user interface elements. A user selection of the icon depicting the given physical object and/or a user selection of the icon depicting the given command may associate output signals generated by sensors of the physical object with control signals associated with the command.

Figure 2:
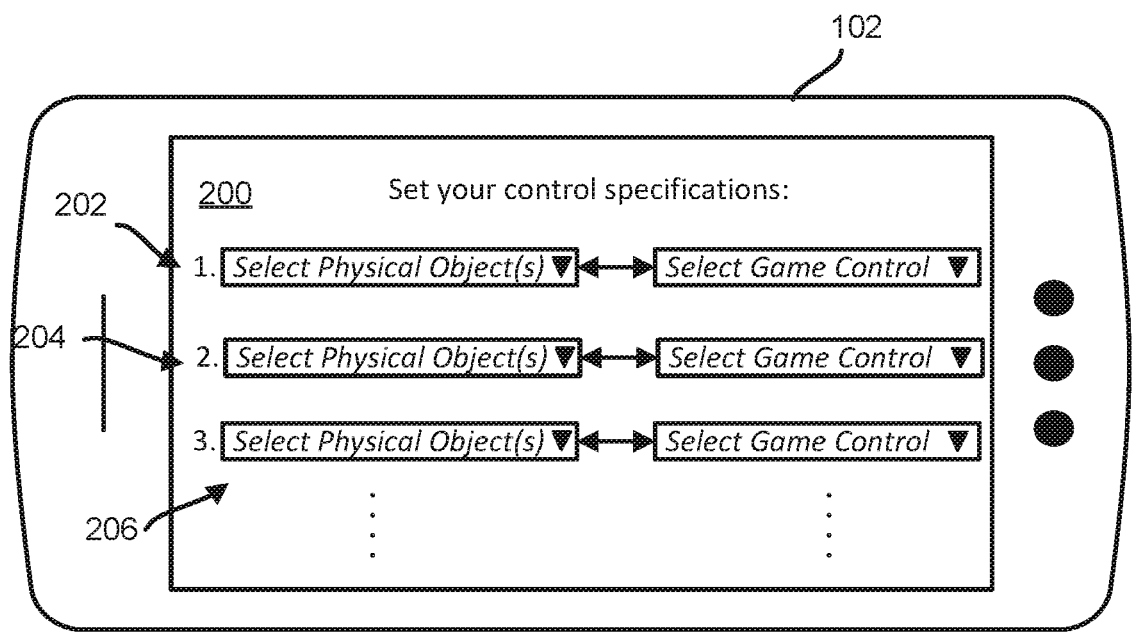
FIG. 2 illustrates exemplary control specification information, in accordance with one or more implementations.

By way of non-limiting illustration in FIG. 2, an exemplary user interface 200 presented on computing platform 102 is depicted. User interface 200 may be configured to obtain user entry and/or selection of information for specifying control specification information, and/or other information. User interface 200 may include one or more sets of user interface elements. By way of non-limiting example, user interface 200 may include one or more of a first set 202 of user interface elements, a second set 204 of user interface elements, a third set 206 of user interface elements, and/or other user interface elements. In some implementations, individual user interface element may comprise drop down menus, and/or other elements. In some implementations, a set of user interface elements may facilitate selection of one or more physical objects and one or more game control commands to associate together.

Returning to FIG. 1, specification component 114 may be configured to determine, from the obtained output signals, one or more control signals based on the control specification information. By way of non-limiting illustration, specification component 114 may look-up control inputs specified by the control specification information based on obtained output signals. By way of non-limiting illustration, the specification component 114 may be configured such that the first control signal and/or other control signals may be determined responsive to obtaining the first output signal and/or other output signals. By way of non-limiting illustration, specification component 114 may be configured to determine the second control signal responsive to obtaining the second output signal and/or other output signals.

In some implementations, the control specification information implemented by specification component 114 may comprise control specification information that may be specific to a given user of computing platform 102, another user of another computing platforms, and/or other control specification information. By way of non-limiting illustration, control specification information may be specific to a given user by virtue of the user providing input via a user interface to define the control specification. In some implementations, specification component 114 may be configured to obtain control specification information specific to another user of another computing platform. Specification component 114 may be configured to implement the control specification that may be specific the other user when determining control signals for the user of computing platform 102. This feature may allow users to challenge each other with respect to user-specific control specification information.

By way of non-limiting illustration, specification component 114 of computing platform 102 may implement control specification information for a first user of computing platform 102 responsive to the control specification information being determined based on the user input from the first user. A specification component of another computing platform (e.g., one of one or more computing platforms 103) may be configured to implement the control specification information for a second user of the other computing platform. By way of non-limiting example, control specification information may be communicated from computing platform 102 of the first user to the other computing platform of the second user. In some implementations, the first user may be associated with a first set of physical objects. In some implementations, the second user may be associated with a second set of physical objects. In this manner, the first user may specify control specification information based on the first set of physical objects available to the first user; and then challenge the second user to control a virtual space and/or video game based on the same control specification information but using the set second of physical objects available to the second user. In some implementations, the first set of physical objects and the second set of physical objects may comprise the same or similar types of physical object with the same or similar sensors. In some implementations, the first set of physical objects and the second set of physical objects may comprise different types of physical objects but with the same or similar sensors generating the same or similar output signals.

The control component 116 may be configured to provide the determined control signals (e.g., to space component 110 and/or other components and/or entity of system 100) for controlling user controlled elements within a virtual space and/or video game taking place in the virtual space. In some implementations the space component 110 may be configured to implement routines, instructions, commands, and/or other information associated with the control signals for controlling one or more user-controlled elements within the virtual space and/or video game taking place in the virtual space.

Figure 3:
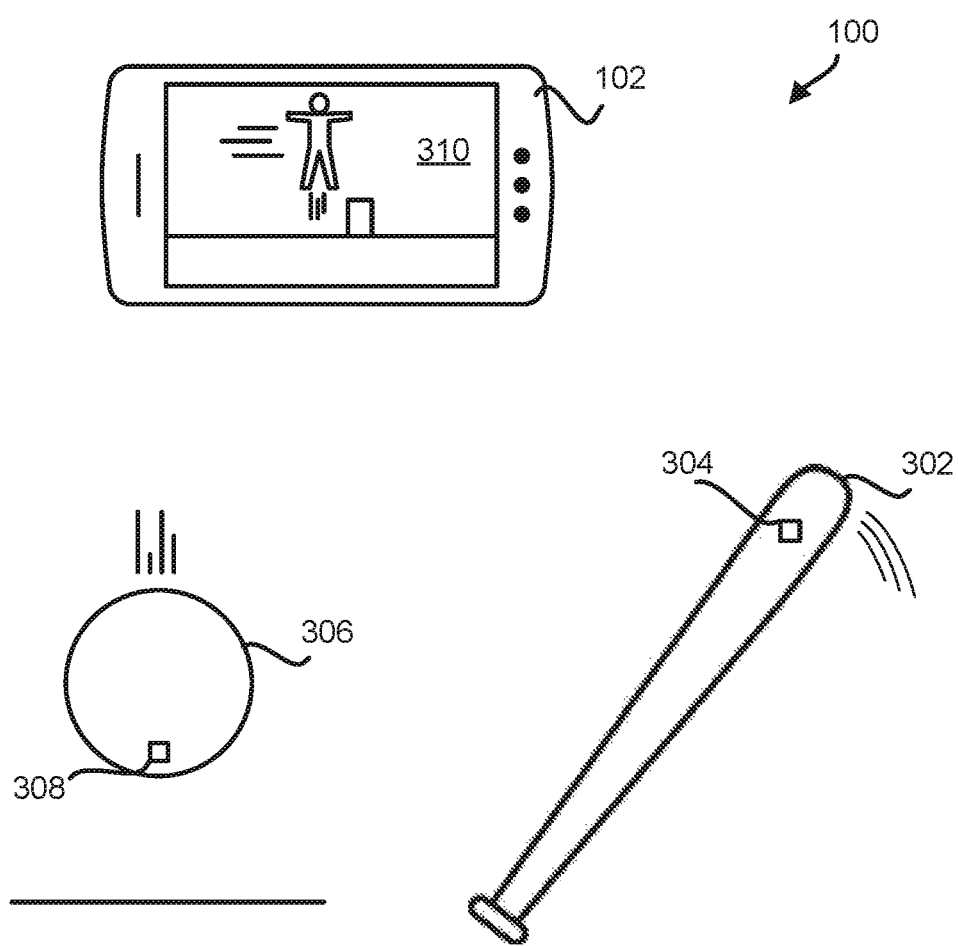
FIG. 3 illustrates an exemplary implementation of the system of FIG. 1.

By way of non-limiting illustration in FIG. 3, an exemplary implementation of system 100 is shown. System 100 in FIG. 3 may include one or more of computing platform 102, a first physical object 302, a second physical object 306, and/or other components. The first physical object may include a first sensor 304 configured to generate a first output signal, and/or other components. The second physical object may include a second sensor 308 configured to generate a second output signal.

In some implementations, first sensor 304 may comprise an accelerometer and/or other sensors. The first output signal may convey motion of first physical object 302, and/or other information. By way of non-limiting illustration, first physical object 302 may comprise a baseball bat. First output signals generated by first sensor 304 may convey a swinging motion of the bat, and/or other information.

In some implementations, second sensor 308 may comprise a contact sensor and/or other sensor. The second output signal may convey instances of contact of second physical object 306 with a surface, and/or other information. By way of non-limiting illustration, second physical object 306 may comprise a ball. Second output signals generated by second sensor 308 may convey instances of contact of the ball on a floor when the ball is bounced, and/or other information.

Returning to FIG. 1, control device 120 may include one or more of one or more physical processors 122 configured by machine-readable instructions 124, electronic storage 132, and/or other components. Executing the machine-readable instructions 124 may cause one or more physical processors 122 to facilitate configuring disparate physical objects to provide control signals for controlling a video game. Control device 120 may be configured to obtain output signals generated by one or more sensors of one or more physical objects 136 and provide associated control signals to one or more computing platforms (e.g., computing platform 102 and/or one or more other computing platform 103). By way of non-limiting illustration, control device 120 may act as a bridge between one or more physical objects 136 and a given computing platform. The machine-readable instructions 124 may include one or more of a reception component 126, a specification component 128, a transmission component 130, and/or other components.

In some implementations, electronic storage 132 may include the same or similar information as electronic storage 118 of computing platform 102. By way of non-limiting illustration, electronic storage 132 may be configured to store control specification information, and/or other information.

Reception component 126 may be configured in the same or similar manner as reception component 112 of computing platform 102, and/or configured in other ways. By way of non-limiting illustration, reception component 126 may be configured to obtain output signals generated by one or more sensors, and/or other information. In some implementations, reception component 126 may be configured to obtain control specification information from computing platform 102 and/or other source. By way of non-limiting illustration, a user may provide input via a user interface presented on computing platform 102. The user input may be associated with specifying control specification information. Computing platform 102 may be configured to transmit the control specification information to control device 120 (e.g., reception component 126) for storage in electronic storage 132.

In some implementations, reception component 126 may be configured to detect presence and/or identify one or more of individual physical objects 16, one or more computing platforms (e.g., computing platform 102 and/or one or more other computing platforms 103), and/or other entities.

In some implementations, specification component 128 may be configured in a same or similar manner as specification component 114 of computing platform 102. By way of non-limiting illustration, specification component 128 may be configured to determine, from the obtained output signals, one or more control signals based on the control specification information.

Transmission component 130 may be configured to effectuate transmission of the determined control signals and/or other information to one or more computing platforms.

Figure 4:
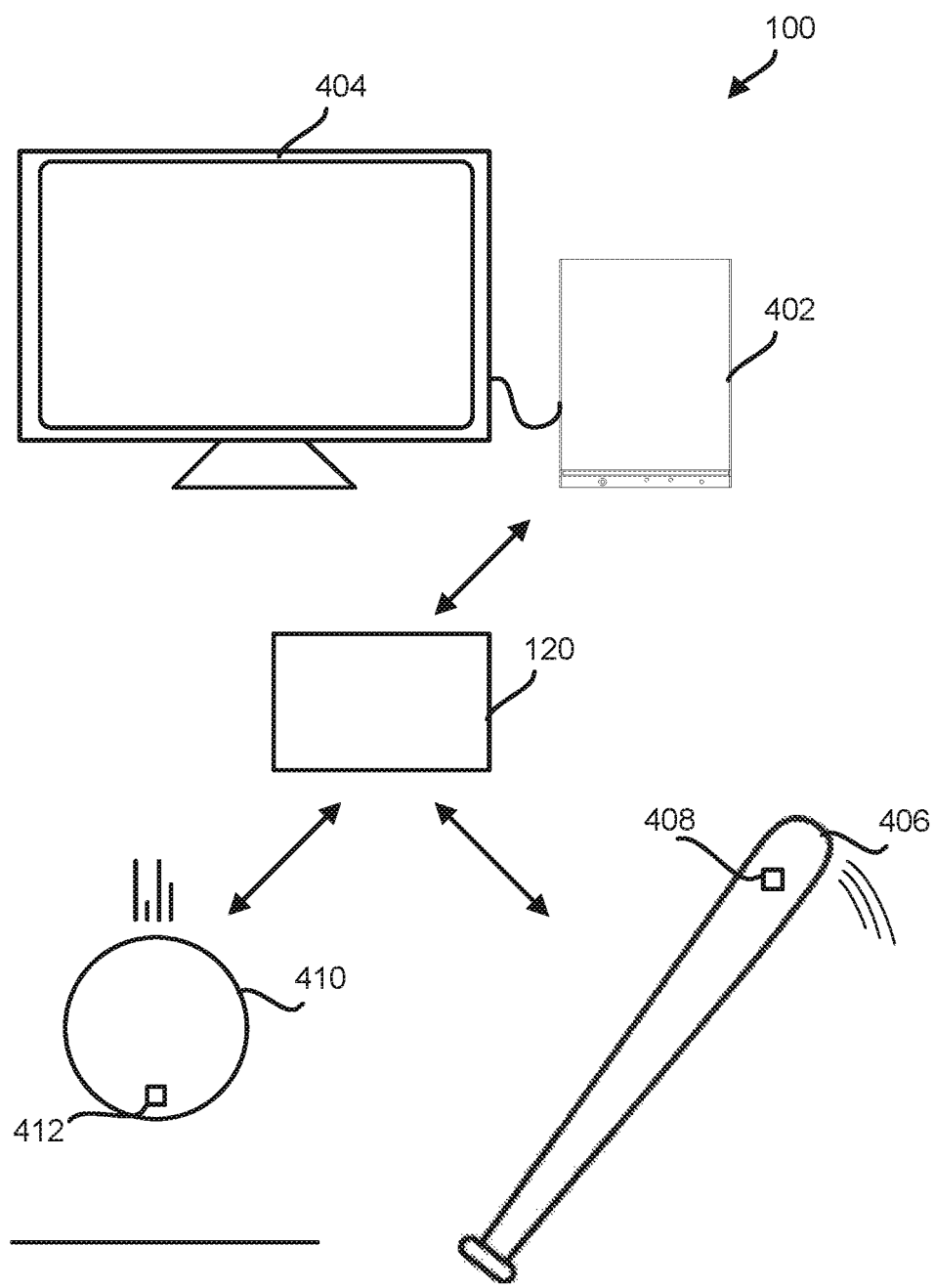
FIG. 4 illustrates another exemplary implementation of the system of FIG. 1.

By way of non-limiting illustration in FIG. 4, another exemplary implementation of system 100 of FIG. 1 is shown. System 100 may include one or more of control device 120, a first physical object 406, a second physical object 410, a presentation device 404, a computing platform 402, and/or other components. In some implementations, first physical object 406 may comprise a first sensor 408 and/or other components. In some implementations, second physical object 410 may comprise a second sensor 412, and/or other components. Computing platform 402 may comprise a game console and/or other platform. Presentation device 404 may be coupled with computing platform 402. Presentation device 404 may comprise, for example, a television set, and/or other device. In some implementations, control device 120 may comprise a bridge device for providing control signals to computing platform 402 based on output signals generated by first physical object 406 and/or second physical object 410.

Returning to FIG. 1, computing platform 102, one or more other computing platforms 103, control device 120, one or more servers 138, one or more physical objects 136, and/or external resources 140 may be operatively linked via one or more electronic communication links. For example, such electronic communication links may be established, at least in part, via one or more networks 134, such as the Internet, BLUETOOTH, and/or other networks. It will be appreciated that this is not intended to be limiting and that the scope of this disclosure includes implementations in which the computing platform 102, one or more other computing platforms 103, control device 120, one or more servers 138, one or more physical objects 136, and/or external resources 140 may be operatively linked via some other communication media.

The external resources 140 may include sources of information, hosts, and/or providers of virtual spaces outside of system 100, external entities participating with system 100, external entities for player-to-player communications, and/or other resources. In some implementations, some or all of the functionality attributed herein to external resources 140 may be provided by resources included in system 100.

Computing platform 102 may include electronic storage 118, one or more processors 104, and/or other components. The computing platform 102 may include communication lines or ports to enable the exchange of information with a network, other computing platforms, and/or other entities within system 100. Illustration of computing platform 102 in FIG. 1 is not intended to be limiting. The computing platform 102 may include a plurality of hardware, software, and/or firmware components operating together to provide the functionality attributed herein to computing platform 102.

Electronic storage 118 may comprise electronic storage media that electronically stores information. The electronic storage media of electronic storage 118 may include one or both of system storage that is provided integrally (i.e., substantially non-removable) with computing platform 102 and/or removable storage that is removably connectable to computing platform 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 104, information received from server(s) 138, information received from one or more other computing platforms 103, information received from one or more physical objects 136, information received from control device 120, and/or other information that enables computing platform 102 to function as described herein.

Processor(s) 104 is configured to provide information-processing capabilities in computing platform 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, 112, 114, and/or 116. Processor(s) 104 may be configured to execute components 108, 110, 112, 114, and/or 116 by software; hardware; firmware; some combination of software, hardware, and/or firmware; and/or other mechanisms for configuring processing capabilities on processor(s) 104.

It should be appreciated that although components 108, 110, 112, 114, and/or 116 are illustrated in FIG. 1 as being co-located within a single processing unit, in implementations in which processor(s) 104 includes multiple processing units, one or more of components 108, 110, 112, 114, and/or 116 may be located remotely from the other components. The description of the functionality provided by the different components 108, 110, 112, 114, and/or 116 described above is for illustrative purposes and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, 116, and/or other components. As another example, processor(s) 104 may be configured to execute one or more additional components that may perform some or all of the functionality attributed below to one of components 108, 110, 112, 114, and/or 116.

Control device 120 may include electronic storage 132, one or more processors 122, and/or other components. Control device 120 may include communication lines or ports to enable the exchange of information with a network and/or other entities of system 100. Illustration of control device 120 in FIG. 1 is not intended to be limiting. Control device 120 may include a plurality of hardware, software, and/or firmware components operating together to provide the functionality attributed herein to control device 120. Control device 120 may be a standalone physical object.

Electronic storage 132 may comprise electronic storage media that electronically stores information. The electronic storage media of electronic storage 132 may include one or both of system storage that is provided integrally (i.e., substantially non-removable) with control device 120 and/or removable storage that is removably connectable to control device 120 via, for example, a port or a drive. A port may include a USB port, a firewire port, and/or other port. A drive may include a disk drive and/or other drive. Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 132 may include one or more virtual storage resources (e.g., cloud storage, a virtual private network, and/or other virtual storage resources). Electronic storage 132 may store software algorithms, information determined by processor(s) 122, information received from server(s) 138, information received from one or more computing platforms (e.g., 102 and/or 103), information received from one or more physical objects 136, and/or other information that enables control device 120 to function as described herein.

Processor(s) 122 is configured to provide information-processing capabilities in control device 120. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 104 may include one or more processing units. These processing units may be physically located within the same device, or processor(s) 122 may represent processing functionality of a plurality of devices operating in coordination. The processor(s) 122 may be configured to execute components 126, 128, and/or 130. Processor(s) 122 may be configured to execute components 126, 128, and/or 130 by software; hardware; firmware; some combination of software, hardware, and/or firmware; and/or other mechanisms for configuring processing capabilities on processor(s) 122.

It should be appreciated that although components 126, 128, and/or 130 are illustrated in FIG. 1 as being co-located within a single processing unit, in implementations in which processor(s) 122 includes multiple processing units, one or more of components 126, 128, and/or 130 may be located remotely from the other components. The description of the functionality provided by the different components 126, 128, and/or 130 described above is for illustrative purposes and is not intended to be limiting, as any of components 126, 128, and/or 130 may provide more or less functionality than is described. For example, one or more of components 126, 128, and/or 130 may be eliminated, and some or all of its functionality may be provided by other ones of components 126, 128, 130, and/or other components. As another example, processor(s) 122 may be configured to execute one or more additional components that may perform some or all of the functionality attributed below to one of components 126, 128, and/or 130.

Figure 5:
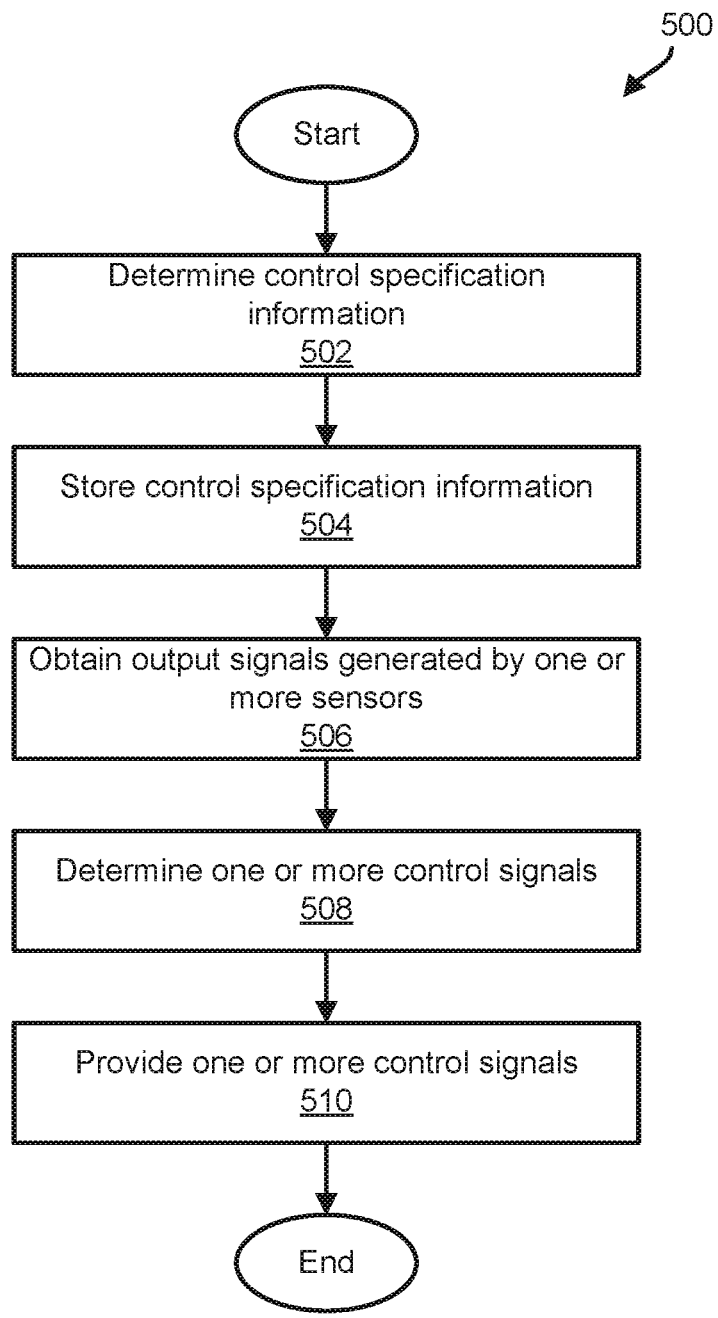
FIG. 5 illustrates a method of configuring disparate physical objects to provide control signals for controlling a game, in accordance with one or more implementations.

FIG. 5 illustrates a method 500 of configuring disparate physical objects to provide control signals for controlling a video game, in accordance with one or more implementations. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in a computer system comprising one or more of one or more processing devices (e.g., a digital processor, an analog processor, a digital circuit designed to process information, an analog circuit designed to process information, a state machine, and/or other mechanisms for electronically processing information), electronic storage media storing machine-readable instructions, a transmitter, and/or other components. The one or more processing devices may include one or more devices executing some or all of the operations of method 500 in response to instructions stored electronically on electronic storage media. The one or more processing devices may include one or more devices configured through hardware, firmware, and/or software to be specifically designed for execution of one or more of the operations of method 500. By way of non-limiting illustration, method 500 may be implemented in one or more of a computing platform (e.g., computing platform 102 in FIG. 1), a control device (e.g., control device 120 of FIG. 1), and/or other devices.

At an operation 502, control specification information may be determined. Control specification information may be determined based on user input and/or other information. Control specification information may specify associations between output signals and control signals. By way of non-limiting illustration, control specification information may specify a first association between a first output signal and a first control signal, a second association between a second output signal and a second control signal, and/or other information. Responsive to obtaining user input from a first user specifying the first association, the second association, and/or other associations, the control specification information may be determined. In some implementations, operation 502 may be performed by one or more physical processors executing a specification component the same or similar to specification component 114 and/or 128 (shown in FIG. 1 and described herein).

At an operation 504, specification information may be stored. In some implementations, operation 504 may be performed by non-transitory electronic storage the same or similar to electronic 118 and/or 132 (shown in FIG. 1 and described herein).

At an operation 506, output signals generated by the one or more sensors may be obtained. Individual ones of the one or more sensors may be disposed on individual ones of one or more physical objects. In some implementations, operation 506 may be performed by one or more physical processors executing a reception component the same as or similar to reception component 112 and/or 126 (shown in FIG. 1 and described herein).

At an operation 508, one or more control signals may be determined from the obtained output signals. The one or more control signals may be determined based on the control specification information and/or other information. By way of non-limiting illustration, the first control signal may be determined responsive to obtaining the first output signal and/or other output signals. The second control signal may be determined responsive to obtaining the second output signal and/or other output signals. In some implementations, operation 508 may be performed by one or more physical processors executing a specification component the same or similar to specification component 114 and/or 128 (shown in FIG. 1 and described herein).

At an operation 510, determined control signals may be provided for controlling a virtual space and/or video game taking place in the virtual space. In some implementations, operation 510 may be performed by one or more physical processors executing a component the same as or similar to control component 116 and/or transmission component 130 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system to configure disparate physical objects to provide control signals for controlling a game, the system comprising:
    a first physical object, the first physical object having a first sensor disposed thereon, the first sensor being configured to generate a first output signal;
    a second physical object, the second physical object having a second sensor disposed thereon, the second sensor being configured to generate a second output signal,
        wherein the first physical object is separate and distinct from the second physical object;
    non-transitory electronic storage media configured to store control specification information, the control specification information specifying associations between output signals generated by individual sensors and control signals for controlling a game; and
    one or more physical processors configured by machine-readable instructions to:
        effectuate presentation of a user interface on a computing platform, the user interface being configured to receive user input to specify the associations of the control specification information;
        determine the control specification information based on the user input, such that responsive to obtaining first user input from a first user specifying a first association between the first output signal and a first control signal and a second association between the second output signal and a second control signal, determine that the control specification information includes the first association and the second association;
        obtain output signals generated by individual sensors of individual physical objects;
        determine, from the obtained output signals, one or more control signals to control the game based on the control specification information, such that the first control signal is determined responsive to obtaining the first output signal and the second control signal is determined responsive to obtaining the second output signal;
        provide the determined control signals for controlling the game, such that the first control signal and the second control signal are provided to control the game;
        wherein determining the control specification information is further based on one or more control specification templates, the one or more control specification templates including a first template, the first template being specific to a first theme, the first theme corresponding to a common use of the first physical object and the second physical object, and wherein the first template specifies one or more predetermined associations between output signals of the first physical object and the second physical object and one or more control signals for controlling the game; and
        determine a third control signal responsive to obtaining a combination of the first output signal and the second output signal.

2. The system of claim 1, wherein the output signals generated by the individual sensors convey one or more of motion, position, orientation, or state of the individual sensors.

3. The system of claim 1, wherein the common use of the first physical object and the second physical object is unrelated to controlling the game.

4. A system to configure disparate physical objects to provide control signals for controlling a game, the system comprising:
   a first physical object, the first physical object having a first sensor disposed thereon, the first sensor being configured to generate a first output signal;
   a second physical object, the second physical object having a second sensor disposed thereon, the second sensor being configured to generate a second output signal,
      wherein the first physical object is separate and distinct from the second physical object;
   non-transitory electronic storage media configured to store control specification information, the control specification information specifying associations between output signals generated by individual sensors and control signals for controlling a game; and
   one or more physical processors configured by machine-readable instructions to:
      effectuate presentation of a user interface on a computing platform, the user interface being configured to receive user input to specify the associations of the control specification information;
      determine the control specification information based on the user input, such that responsive to obtaining first user input from a first user specifying a first association between the first output signal and a first control signal and a second association between the second output signal and a second control signal, determine that the control specification information includes the first association and the second association;
      obtain output signals generated by individual sensors of individual physical objects;
      determine, from the obtained output signals, one or more control signals to control the game based on the control specification information, such that the first control signal is determined responsive to obtaining the first output signal and the second control signal is determined responsive to obtaining the second output signal;
      provide the determined control signals for controlling the game, such that the first control signal and the second control signal are provided to control the game;
      wherein determining the control specification information is further based on one or more control specification templates, the one or more control specification templates including a first template, the first template being specific to a first theme, the first theme corresponding to a common use of the first physical object and the second physical object, and wherein the first template specifies one or more predetermined associations between output signals of the first physical object and the second physical object and one or more control signals for controlling the game;
      implement the control specification information for the first user responsive to the control specification information being determined based on the first user input from the first user, the first user being associated with the first physical object and the second physical object; and
      implement the control specification information for a second user, the second user being associated with a third physical object and a fourth physical object.

5. A system to configure disparate physical objects to provide control signals for controlling a game, the system comprising:
   a first physical object, the first physical object having a first sensor disposed thereon, the first sensor being configured to generate a first output signal;
   a second physical object, the second physical object having a second sensor disposed thereon, the second sensor being configured to generate a second output signal,
      wherein the first physical object is separate and distinct from the second physical object;
   non-transitory electronic storage media configured to store control specification information, the control specification information specifying associations between output signals generated by individual sensors and control signals for controlling a game; and
   one or more physical processors configured by machine-readable instructions to:
      effectuate presentation of a user interface on a computing platform, the user interface being configured to receive user input to specify the associations of the control specification information;
      determine the control specification information based on the user input, such that responsive to obtaining first user input from a first user specifying a first association between the first output signal and a first control signal and a second association between the second output signal and a second control signal, determine that the control specification information includes the first association and the second association;
      obtain output signals generated by individual sensors of individual physical objects;
      determine, from the obtained output signals, one or more control signals to control the game based on the control specification information, such that the first control signal is determined responsive to obtaining the first output signal and the second control signal is determined responsive to obtaining the second output signal;
      provide the determined control signals for controlling the game, such that the first control signal and the second control signal are provided to control the game;
      wherein determining the control specification information is further based on one or more control specification templates, the one or more control specification templates including a first template, the first template being specific to a first theme, the first theme corresponding to a common use of the first physical object and the second physical object, and wherein the first template specifies one or more predetermined associations between output signals of the first physical object and the second physical object and one or more control signals for controlling the game; and
      detect presence of the individual physical objects based on signals received from the individual physical objects, the first physical object being detectable based on a third signal conveying information associated with the first physical object, and the second physical object being detectable based on a fourth signal conveying information associated with the second physical object.

6. The system of claim 5, wherein the control specification information is specific to the computing platform.

7. The system of claim 5, wherein the common use of the first physical object and the second physical object is unrelated to controlling the game.

8. A system to configure disparate physical objects to provide control signals for controlling a game, the system comprising:

a first physical object, the first physical object having a first sensor disposed thereon, the first sensor being configured to generate a first output signal;

a second physical object, the second physical object having a second sensor disposed thereon, the second sensor being configured to generate a second output signal, wherein the first physical object is separate and distinct from the second physical object; and a control device, the control device comprising:

non-transitory electronic storage media configured to store control specification information, the control specification information specifying associations between output signals generated by individual sensors and individual control signals for controlling a game; and one or more physical processors configured by machine-readable instructions to:

determine the control specification information based on user input into a user interface presented on a computing platform, the user input specifying the associations of the control specification information, such that responsive to obtaining first user input from a first user specifying a first association between the first output signal and a first control signal and a second association between the second output signal and a second control signal, determine that the control specification information includes the first association and the second association;

obtain output signals generated by the individual sensors, the individual sensors being disposed on or in individual physical objects;

determine, from the obtained output signals, one or more control signals to control the game based on the control specification information, such that the first control signal is determined responsive to obtaining the first output signal and the second control signal is determined responsive to obtaining the second output signal;

effectuate transmission of the determined control signals to the computing platform to control the game;

wherein determining the control specification information is further based on one or more control specification templates, the one or more control specification templates including a first template, the first template being specific to a first theme, the first theme corresponding to a common use of the first physical object and the second physical object, and wherein the first template specifies one or more predetermined associations between output signals of the first physical object and the second physical object and one or more control signals for controlling the game; and determine a third control signal responsive to obtaining a combination of the first output signal and the second output signal.

9. A method of configuring disparate physical objects to provide control signals for controlling a game, the method being implemented in a system comprising one or more physical processors, non-transitory electronic storage, a first physical object and a second physical object, the first physical object being separate and distinct from the second physical object, the first physical object having a first sensor disposed thereon, the first sensor being configured to generate a first output signal, the second physical object having a second sensor disposed thereon, the second sensor being configured to generate a second output signal, the method comprising:

effectuating presentation of a user interface on a computing platform, the user interface being configured to receive user input to specify control specification information, the control specification information specifying associations between output signals of individual sensors of individual physical objects and control signals for controlling a game;

determining the control specification information based on the user input, individual responsive to obtaining first user input from a first user specifying a first association between the first output signal and a first control signal and a second association between the second output signal and a second control signal, determining that the control specification information includes the first association and the second association;

storing the control specification information;

obtaining output signals generated by the individual sensors of the individual physical objects;

determining, from the obtained output signals, one or more control signals to control the game based on the control specification information, such that the first control signal is determined responsive to obtaining the first output signal and the second control signal is determined responsive to obtaining the second output signal;

providing the determined control signals for controlling the game, including providing the first control signal and the second control signal to control the game;

wherein determining the control specification information is further based on one or more control specification templates, the one or more control specification templates including a first template, the first template being specific to a first theme, the first theme corresponding to a common use of the first physical object and the second physical object, and wherein the first template specifies one or more predetermined associations between output signals of the first physical object and the second physical object and one or more control signals for controlling the game; and determining a third control signal responsive to obtaining a combination of the first output signal and the second output signal.

10. The method of claim 9, wherein the output signals generated by the individual sensors convey one or more of motion, position, orientation, or state of the individual sensors.

11. The method of claim 9, wherein the common use of the first physical object and the second physical object is unrelated to controlling the game.

12. A method of configuring disparate physical objects to provide control signals for controlling a game, the method being implemented in a system comprising one or more physical processors, non-transitory electronic storage, a first physical object and a second physical object, the first physical object being separate and distinct from the second physical object, the first physical object having a first sensor disposed thereon, the first sensor being configured to generate a first output signal, the second physical object having a second sensor disposed thereon, the second sensor being configured to generate a second output signal, the method comprising:

effectuating presentation of a user interface on a computing platform, the user interface being configured to receive user input to specify control specification information, the control specification information specifying associations between output signals of individual sensors of individual physical objects and control signals for controlling a game;

determining the control specification information based on the user input, individual responsive to obtaining first user input from a first user specifying a first association between the first output signal and a first control signal and a second association between the second output signal and a second control signal, determining that the control specification information includes the first association and the second association;

storing the control specification information;

obtaining output signals generated by the individual sensors of the individual physical objects;

determining, from the obtained output signals, one or more control signals to control the game based on the control specification information, such that the first control signal is determined responsive to obtaining the first output signal and the second control signal is determined responsive to obtaining the second output signal;

providing the determined control signals for controlling the game, including providing the first control signal and the second control signal to control the game;

wherein determining the control specification information is further based on one or more control specification templates, the one or more control specification templates including a first template, the first template being specific to a first theme, the first theme corresponding to a common use of the first physical object and the second physical object, and wherein the first template specifies one or more predetermined associations between output signals of the first physical object and the second physical object and one or more control signals for controlling the game;

implementing the control specification information for the first user responsive to the control specification information being determined based on the first user input from the first user, the first user being associated with the first physical object and the second physical object; and implementing the control specification information for a second user, the second user being associated with a third physical object and a fourth physical object.

13. A method of configuring disparate physical objects to provide control signals for controlling a game, the method being implemented in a system comprising one or more physical processors, non-transitory electronic storage, a first physical object and a second physical object, the first physical object being separate and distinct from the second physical object, the first physical object having a first sensor disposed thereon, the first sensor being configured to generate a first output signal, the second physical object having a second sensor disposed thereon, the second sensor being configured to generate a second output signal, the method comprising:

effectuating presentation of a user interface on a computing platform, the user interface being configured to receive user input to specify control specification information, the control specification information specifying associations between output signals of individual sensors of individual physical objects and control signals for controlling a game;

determining the control specification information based on the user input, individual responsive to obtaining first user input from a first user specifying a first association between the first output signal and a first control signal and a second association between the second output signal and a second control signal, determining that the control specification information includes the first association and the second association;

storing the control specification information;

obtaining output signals generated by the individual sensors of the individual physical objects;

determining, from the obtained output signals, one or more control signals to control the game based on the control specification information, such that the first control signal is determined responsive to obtaining the first output signal and the second control signal is determined responsive to obtaining the second output signal;

providing the determined control signals for controlling the game, including providing the first control signal and the second control signal to control the game;

wherein determining the control specification information is further based on one or more control specification templates, the one or more control specification templates including a first template, the first template being specific to a first theme, the first theme corresponding to a common use of the first physical object and the second physical object, and wherein the first template specifies one or more predetermined associations between output signals of the first physical object and the second physical object and one or more control signals for controlling the game; and detecting presence of the individual physical objects based on signals received from the individual physical objects, the first physical object being detectable based on a third signal conveying information associated with the first physical object, and the second physical object being detectable based on a fourth signal conveying information associated with the second physical object.

14. The method of claim 13, wherein the control specification information is specific to the computing platform.

15. The method of claim 13, wherein the common use of the first physical object and the second physical object is unrelated to controlling the game.

16. A method of configuring disparate physical objects to provide control signals for controlling a game, the method being implemented in a system comprising a control device, a first physical object, and a second physical object, the first physical object being separate and distinct from the second physical object, the first physical object having a first sensor disposed thereon, the first sensor being configured to generate a first output signal, the second physical object having a second sensor disposed thereon, the second sensor being configured to generate a second output signal, the method comprising:

storing control specification information, the control specification information specifying associations between output signals generated by individual sensors and individual control signals for controlling a game;

determining the control specification information based on user input into a user interface presented on a computing platform, the user input specifying the associations of the control specification information, including responsive to obtaining first user input from a first user specifying a first association between the first output signal and a first control signal and a second association between the second output signal and a second control signal, the control specification information is determined to include the first association and the second association;

obtaining output signals generated by the individual sensors, individual sensors being disposed on or in individual physical objects;

determining, from the obtained output signals, one or more control signals to control the game based on the control specification information, such that the first control signal is determined responsive to obtaining the first output signal and the second control signal is determined responsive to obtaining the second output signal;

effectuating transmission of the determined control signals to the computing platform to control the game;

wherein determining the control specification information is further based on one or more control specification templates, the one or more control specification templates including a first template, the first template being specific to a first theme, the first theme corresponding to a common use of the first physical object and the second physical object, and wherein the first template specifies one or more predetermined associations between output signals of the first physical object and the second physical object and one or more control signals for controlling the game; and determining a third control signal responsive to obtaining a combination of the first output signal and the second output signal.

* * * * *